US010855512B2

(12) United States Patent
Anderson et al.

(10) Patent No.: US 10,855,512 B2
(45) Date of Patent: *Dec. 1, 2020

(54) DYNAMIC ACCOUNT UPDATING

(71) Applicant: Apple Inc., Cupertino, CA (US)

(72) Inventors: Ian W. Anderson, Santa Clara, CA (US); Neil V. Jhaveri, San Jose, CA (US); Terence D. Blanchard, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,790

(22) Filed: Jan. 23, 2019

(65) Prior Publication Data

US 2019/0215225 A1 Jul. 11, 2019

Related U.S. Application Data

(63) Continuation of application No. 14/291,596, filed on May 30, 2014, now Pat. No. 10,200,233.

(51) Int. Cl.
*H04L 29/06* (2006.01)
*H04L 29/08* (2006.01)
*H04L 12/24* (2006.01)

(52) U.S. Cl.
CPC .... *H04L 29/06965* (2013.01); *H04L 41/0816* (2013.01); *H04L 41/0836* (2013.01); *H04L 63/08* (2013.01); *H04L 67/10* (2013.01); *H04L 67/141* (2013.01); *H04L 69/326* (2013.01); *H04L 63/166* (2013.01)

(58) Field of Classification Search
CPC .. H04L 29/06965; H04L 69/326; H04L 63/08
See application file for complete search history.

(56) References Cited

U.S. PATENT DOCUMENTS

| 6,405,243 B1* | 6/2002 | Nielsen | H04L 29/12009 709/206 |
| 9,037,685 B2* | 5/2015 | Welingkar | H04L 67/34 709/220 |
| 10,200,233 B2 | 2/2019 | Anderson et al. | |

(Continued)

FOREIGN PATENT DOCUMENTS

| JP | 2003099346 A | 4/2003 |
| JP | 2007065707 A | 3/2007 |
| KR | 1020070094020 A | 9/2007 |

OTHER PUBLICATIONS

PCT Application No. PCT/US2015/026945—International Search Report and Written Opinion dated Jul. 15, 2015.

*Primary Examiner* — Farid Homayounmehr
*Assistant Examiner* — Suman Debnath
(74) *Attorney, Agent, or Firm* — Dickinson Wright RLLP

(57) ABSTRACT

A method and apparatus for dynamically updating settings of an electronic mail client of a client device is disclosed. In one embodiment, as the client device moves to different network environments, the settings of the electronic mail client are automatically updated to account for each network's characteristics and operational requirements. In another embodiment, the settings of the electronic mail client are automatically updated to account for changes (e.g., upgrades) at a particular server. The settings can be updated based on network information or server information from received from another device.

20 Claims, 11 Drawing Sheets

(56) References Cited

U.S. PATENT DOCUMENTS

| | | | |
|---|---|---|---|
| 2003/0101245 | A1 | 5/2003 | Srinivasan et al. |
| 2007/0185962 | A1* | 8/2007 | Bocking .................. H04L 51/02 709/206 |
| 2007/0226301 | A1* | 9/2007 | Provo ................... G06Q 10/107 709/206 |
| 2007/0288581 | A1 | 12/2007 | Yoshii |
| 2013/0013722 | A1* | 1/2013 | Zhang ................... H04W 76/10 709/206 |
| 2013/0185586 | A1* | 7/2013 | Vachharajani ...... G06F 11/0709 714/2 |
| 2013/0198245 | A1 | 8/2013 | Kagan et al. |
| 2014/0150051 | A1 | 5/2014 | Bharali et al. |
| 2014/0189843 | A1* | 7/2014 | Francisco ........... H04L 63/0876 726/9 |

* cited by examiner

INCOMING MAIL SERVER SETTINGS

Account Type: ☐ POP  ☐ Exchange
☐ IMAP

Host Name: [_____]

Password: [_____]

Port: ☐ 110 (POP)  ☐ 993 (IMAP w SSL)  ☐ Other [__]
☐ 143 (IMAP)  ☐ 995 (POP w SSL)

Authentication: ☐ Password  ☐ Kerberos
☐ MD5  ☐ NTLM
☐ None  ☐ Cleartext

Secure Sockets Layer (SSL): ☐ Yes  ☐ No

Dynamically Update: ☐ Yes  ☐ No

*FIG. 4*

OUTGOING MAIL SERVER SETTINGS

- 502: Account Type: ☐ SMTP ☐ Exchange
- 504: Host Name:
- 506: Password:
- 508: Port: ☐ 25 (SMTP)  ☐ 587 (SMTP)
  ☐ 465 (SMTP w SSL) ☐ Other
- 510: Authentication: ☐ Password ☐ Kerberos
  ☐ MD5 ☐ NTLM
  ☐ None ☐ Cleartext
- 512: Secure Sockets Layer (SSL): ☐ Yes ☐ No
- 514: Dynamically Update: ☐ Yes ☐ No

DYNAMIC ACCOUNT UPDATING

CROSS-REFERENCE TO RELATED APPLICATIONS

The present application is a continuation of U.S. application Ser. No. 14/291,596, filed May 30, 2014, entitled "DYNAMIC ACCOUNT UPDATING," set to issue Feb. 5, 2019 as U.S. Pat. No. 10,200,233, the content of which is incorporated herein by reference in its entirety for all purposes.

FIELD

The present disclosure relates generally to updating settings of an application. More specifically, the present embodiments relate to dynamically updating settings of an electronic mail client to account for various network conditions.

BACKGROUND

Recent advances in portable computing devices have allowed users to travel and use network resources at various locations. In some cases, a network can require a portable computing device to have a particular configuration in order to properly use the network's resources. Furthermore, a network's configuration can change, rendering a previous configuration of the portable computing device to be obsolete. Because requirements can vary from network to network, a user must manually configure the portable computing device when changing network environments. This can be inconvenient and cumbersome, particularly when a user uses a number of networks that have different requirements throughout the day.

SUMMARY

This paper describes various embodiments that relate to updating settings of an application.

Other aspects and advantages of the invention will become apparent from the following detailed description taken in conjunction with the accompanying drawings which illustrate, by way of example, the principles of the described embodiments.

In one embodiment, a method for updating a setting of an application is disclosed. The method can be carried out at a client device. The method includes storing a first configuration for the setting of the application; and establishing a first connection, via a first network, to the server using the application while the setting of the application is in accordance with the first configuration. The method further includes the client device automatically updating the setting of the application in accordance with a second configuration different from the first configuration; and establishing a second connection, via a second network different from the first network, to the server using the application while the setting of the application is in accordance with the second configuration.

In another embodiment, a method for updating settings of an electronic mail client is disclosed. The method can be carried out at a client device. The method includes storing a first configuration of one or more settings of the electronic mail client, the first configuration identifying a first server for retrieving or delivering messages and attempting to retrieve or deliver a message using the first server. In response to failing to retrieve or deliver the message using the first server, the method can include sending a report to a second server, the report including electronic mail account information. Furthermore, the client device can receive server information from the second server, the server information relating to the electronic mail account information and automatically update the one or more settings of the electronic mail client in accordance with a second configuration. The second configuration being different from the first configuration and based on the received server information.

In another embodiment, a client device is disclosed. The client device can include a processor, a network interface and a storage device. The storage device can store instructions, that, when executed by the processor, can cause the client device to perform the following: establishing a connection to a mail server using an electronic mail client while the settings of the electronic mail client is in accordance with a first configuration; sending a request to the mail server for information relating to supported features of the mail server and receiving server information from the mail server. The server information identifies one or more security features supported by the mail server. Next, selecting a security feature based on the server information and updating the settings of the electronic mail client from the first configuration of settings to a second configuration of settings. The second configuration of settings causes the client device to communicate with the mail server using the selected security feature.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which:

FIG. 4 shows an interface for configuring incoming mail server settings in accordance with some embodiments.

FIG. 5 shows an interface for configuring outgoing mail server settings in accordance with some embodiments.

DETAILED DESCRIPTION

Figure 1:
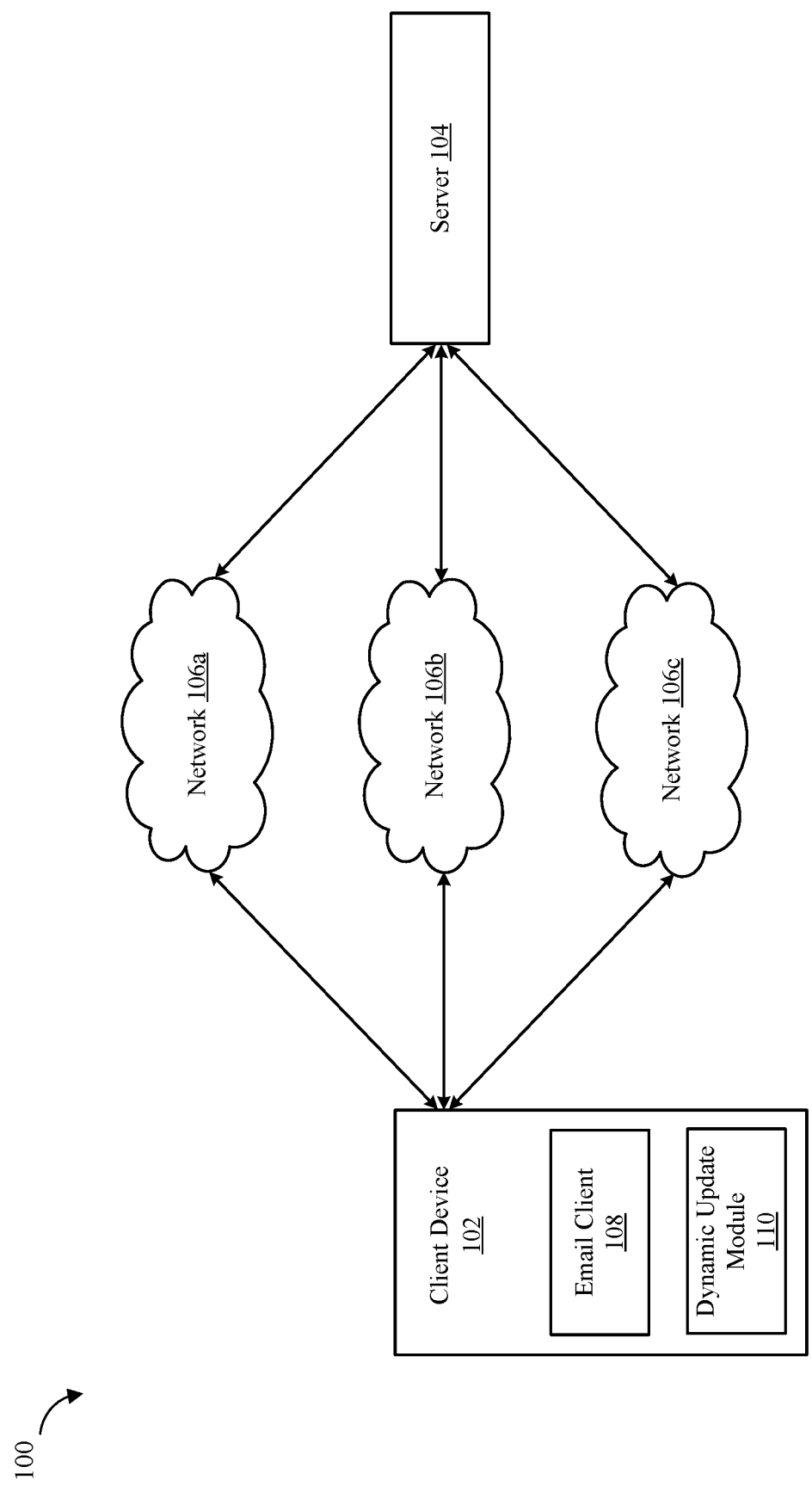
FIG. 1 shows a system in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Accounts settings for an electronic mail client stored on a portable client device can be dynamically updated to account for various network conditions that may otherwise prohibit the electronic mail client from properly communicating with a mail server. As a user of the client device transitions from one network to another network, the account settings can dynamically change based on the current network the client device is connected to, such that the electronic mail client is configured to communicate with the mail server over several networks with minimal interruption. The account settings can be updated automatically, obviating the need for manual configuration of the account settings when a change is required. In this regard, the user of the client device can experience seamless mail service while transitioning between different network environments.

Upon experiencing a failed connection to the mail server, the client device can provide a remote device with information relating to the failure, an electronic mail account, information relating to the network the client device used during the failed attempt, and/or the electronic mail client's settings. The remote device can examine the information and determine an alternative mail server based on the information received from the client device. The remote device can then send the client device network information associated with the alternative mail server such as host names and port numbers. The client device can use the network information to update the account settings. In this regard, the electronic mail client is now aware of and is configured to connect to the alternative server. This can be particularly useful when the client device is connected to a network that blocks communications to a particular mail server.

The account settings can also be updated to account for changes made at the mail server. The mail server can be upgraded to support a security feature, authentication feature, or other resource that was previously not supported. Upon connecting to the upgraded mail server, the client device can detect or inquire as to which features the mail server supports and automatically update the account settings of the electronic mail client in order to utilize the one or more features. In this regard, the electronic mail client is continuously updated to take advantage of mail server upgrades. This is particularly useful as mail server upgrades are often unbeknown to users and/or require tedious, manual configuration of the electronic mail client settings.

These and other embodiments are discussed below with reference to FIGS. 1-11; however, those skilled in the art will readily appreciate that the detailed description given herein with respect to these figures is for explanatory purposes only and should not be construed as limiting.

FIG. 1 shows a system 100 in accordance with some embodiments. The system 100 can include a client device 102, a server 104, and a number of networks 106a/106b/106c. By way of non-limiting example, the client device 102 can be embodied as a computing device, such as a smart phone device, a tablet computing device, a laptop computing device, and/or other computing device that can be configured to communicate with a server over one or more networks. The client device 102 can include one or more applications such as an electronic mail (email) client 108 (also referred to as an electronic mail application or a mail user agent (MUA)). The electronic mail client 108 is an application configured to retrieve and/or send electronic messages using the server 104 over a network 106a/106b/106c. The client device 102 can also include a dynamic update module 110 that is configured to update and manage settings associated with the electronic mail client 108. The dynamic update module 110 is described in more detail herein.

The server 104 can be any computing device configured to provide electronic mail services. In some embodiments, the server 104 can be a server that is configured to receive, store and manage electronic messages (referred to as an "incoming mail" server or mail transfer agent (MTA)). Electronic messages stored at the server 104 can be retrieved by the client device 102 (using the electronic mail client 108) over a network 106a/106b/106c. For example, the server 104 can support Post Office Protocol (POP) functionality. In another example, the server 104 can support Internet Message Access Protocol (IMAP) functionality. In other embodiments, the server 104 can be a server that is configured to authenticate users and deliver electronic messages (referred to as an "outgoing mail" server or mail submission agent (MSA)). Electronic messages generated at the client device 102 (using the electronic mail client 108) can be sent to the server 104 over a network 106a/106b/106c for delivery. In this regard, the server 104 can cooperate with one or more other servers to deliver an electronic message on behalf of the client device 102. For example, the server 104 can deliver and/or relay outgoing electronic messages in accordance with a Simple Mail Transfer Protocol (SMTP).

The server 104 can use any number of technologies or protocols for facilitating electronic message services. For example, the server 104 can utilize a cryptographic protocol (e.g., Secure Sockets Layer (SSL) or Transport Layer Security (TLS)) to provide secure communications with the client device 102 over a network 106a/106b/106c. Furthermore, although the server 104 is depicted as a single server in FIG. 1, it should be appreciated that the server 104 can include a number of servers that cooperate to provide electronic mail services. The server 104 can also function as an incoming mail server, an outgoing mail server or both.

The client device 102 can communicate with the server 104 over one or more networks as represented by networks 106a, 106b, and 106c. A network 106a/106b/106c can include one or more of the Internet, an intranet, a PAN (Personal Area Network), a LAN (Local Area Network), a WAN (Wide Area Network), a MAN (Metropolitan Area Network), a wireless communication network, and other network or combination of networks. In some embodiments, each network 106a/106b/106c can be located at different geographical locations. For example the network 106a can be located at a user's home, the network 106b can be located at a user's workplace and the network 106c can be at a public location, such as a coffee shop or airport. In other embodiments, two or more of the networks 106a/106b/106c can be located at the same geographical location. For example, the network 106a can be a Wi-Fi network and the network 106b can be an Ethernet network, both of which are located in the same office building. Although only three networks are depicted in FIG. 1, it should be appreciated that the client device 102 can communicate with the server 104 over any number of networks.

Each network 106a/106b/106c can have unique operational requirements, characteristics and/or protocols. For example, the network 106b can have a firewall or filter that blocks all communications using port 25 while the network 106c requires all electronic mail-related communications use port 25. In this regard, a static configuration of the electronic mail client 108 may not be suitable for two or more networks. The electronic mail client 108 can be dynamically configured to account for each network's unique characteristics in order to properly communicate with the server 104. Configuration of the electronic mail client 108 can include changes to one or more settings (as described in more detail herein). This can include changing one or more values assigned to a setting. Continuing the example above, the electronic mail client 108 can be automatically configured to use a port other than port 25 when communicating with the server 104 over the network 106b, and be automatically configured to use port 25 when communicating with the server 104 over the network 106c. The dynamic configuration of the electronic mail client 108 can occur automatically such that electronic mail functionality is not disrupted as the client device 102 transitions to different networks.

The dynamic configuration and updating features of the embodiments described herein can be performed by a dynamic update module 110. The dynamic update module 110 can be a separate, independent application that works in conjunction with the electronic mail client 108 or an integrated feature of the electronic mail client 108. The dynamic update module 110 can automatically update settings of the electronic mail client 108 as the client device 102 transitions between networks 106a/106b/106c. In this regard, the dynamic update module 110 can identify the network the client device 102 is connected to and update settings of the electronic mail client 108 accordingly. The dynamic update module 110 can identify the network the client device 102 is connected to using network information associated with the network. By way of non-limiting example, the dynamic update module 110 can identify the network using (1) a service set identifier (SSID), (2) an Internet Protocol (IP) address, (3) a media access control (MAC) address, (4) a name server, and/or (5) a geographical location associated with the network. Network information can be stored at the client device 102 or stored at another device that the client device 102 can access. The dynamic update module 110 can store and manage a configuration of settings for each network 106a/106b/106c respectively.

Furthermore, a network, e.g. network 106a, can change its characteristics, rendering a previously successful configuration of settings for the electronic mail client 108 to be obsolete. In one example, the network 106a can be upgraded with a firewall, preventing the use of a port that was otherwise usable prior to the upgrade. In another example, the network 106a can be changed to permit the use of a network resource or feature, allowing a preferred configuration be used that was not otherwise available. In this regard, the dynamic update module 110 can also account for changes within a network and update settings accordingly.

Figure 2:
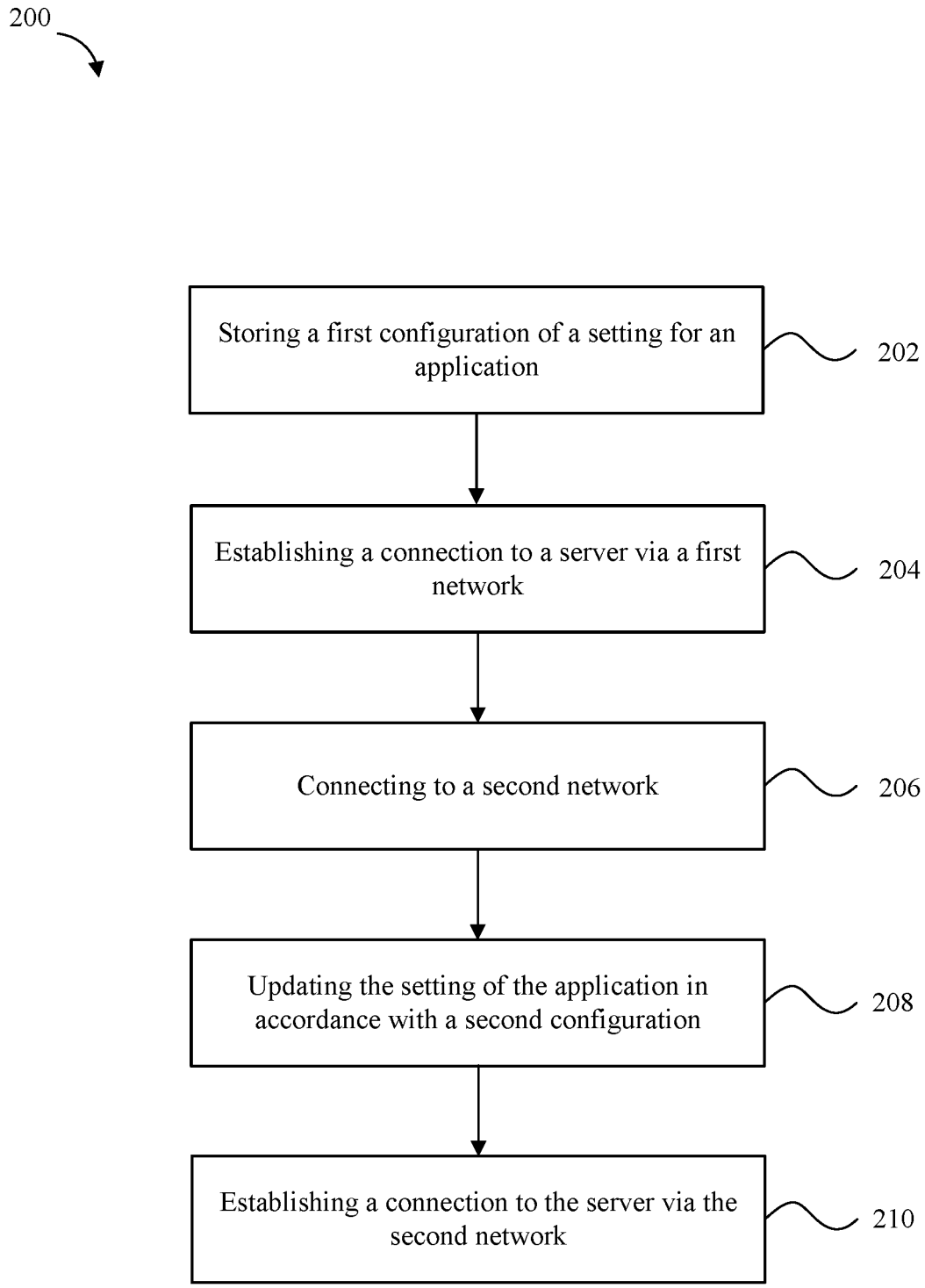
FIG. 2 shows a block diagram representing a method for dynamically updating settings of an application in accordance with some embodiments.

FIG. 2 is a block diagram 200 representing a method for dynamically updating settings of an application in accordance with some embodiments. The method can be carried out by an exemplary client device 102. In a first step at 202, the client device 102 can store one or more settings of an application, e.g., electronic mail client 108. The settings can be set in accordance with a first configuration. The first configuration can be set manually by a user or set by the dynamic update module 110. At step 204, the client device 102 can establish a connection to the server 104 over a first network, e.g., network 106a. The connection to the server 104 can be established using the electronic mail client 108 with settings in accordance with the first configuration. At step 206, the client device 102 can connect to a second network, e.g., network 106b. In some embodiments, step 206 can include the client device 102 disconnecting from the network 106a and subsequently connecting to the network 106b. The transition from network 106a to network 106b can coincide with the client device 102 moving to a different geographical location. In other embodiments, the transition can include the client device 102 discovering and connecting to network 106b while concurrently connected to the network 106a. Step 206 includes updating one or more settings of the electronic mail client 108 in accordance with a second configuration. The second configuration can be based on one or more characteristics of the network 106b and can be different from the first configuration. For example, the first configuration can set the electronic mail client 108 to retrieve electronic messages using 'port 25' while the second configuration uses 'port 587.' Updating the setting(s) can be performed by the dynamic update module 110. Next at step 210, the client device 102 can establish a connection to the server 104 over the network 106b using the electronic mail client 108 configured in accordance with the second configuration.

Figure 3:
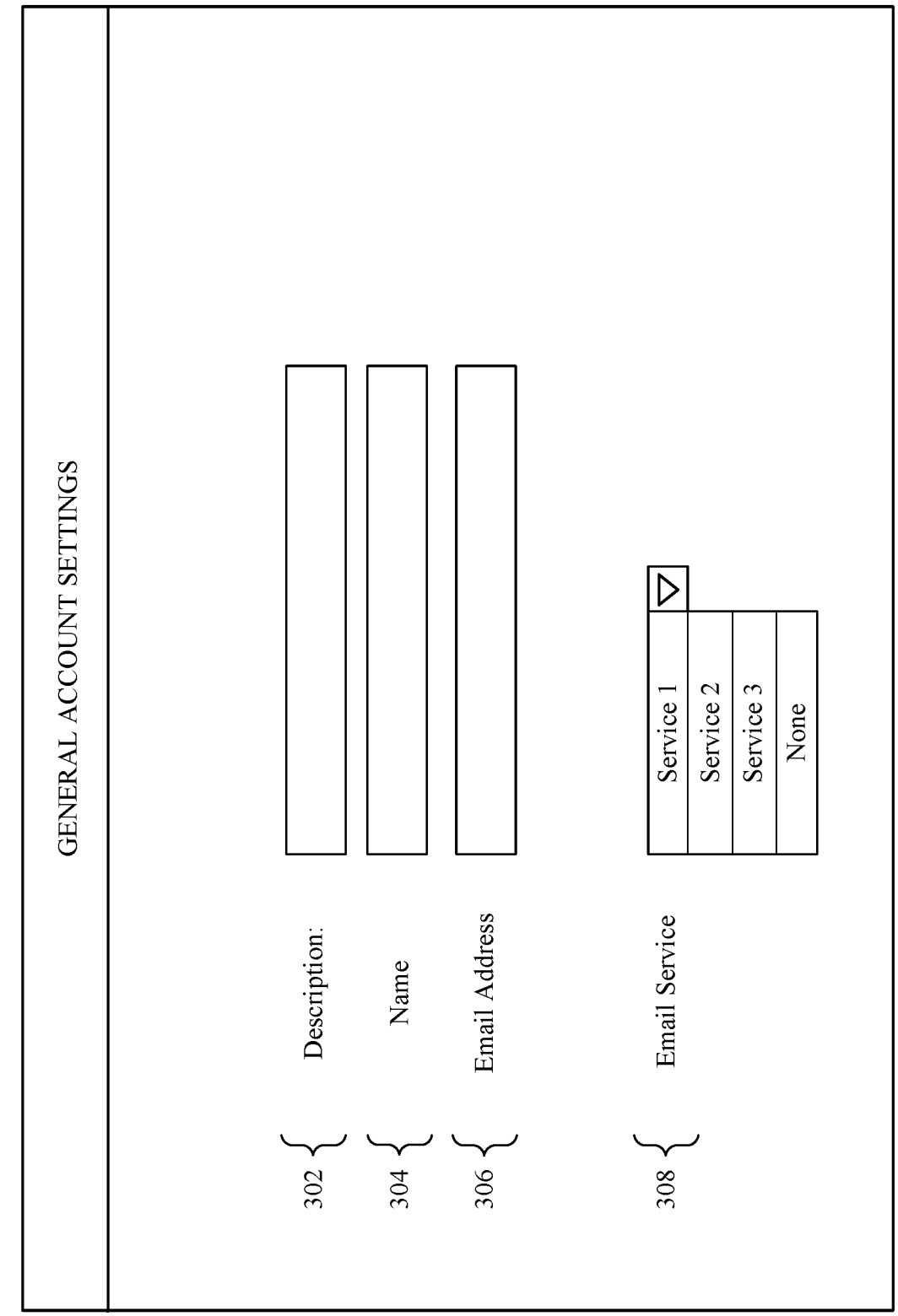
FIG. 3 shows an interface for configuring general account settings in accordance with some embodiments.

FIG. 3 shows an exemplary interface 300 for configuring general account settings in accordance with some embodiments. The interface 300 can be an interface included in the electronic mail client 108. A screen display of the client device 102 can present the interface 300 to a user. The user can configure each setting displayed in the interface 300 using a user interface device, such as a touch screen, keyboard, or mouse. The interface 300 can be used to initially set up and configure an electronic mail account. The interface 300 can include a Description field 302, a Name field 304, an Email Address field 306 and an Email Service setting 308. The Description field 302 can be used to assign a description to an electronic mail account. For example, a user can assign an electronic mail account with the description, "Patrick's Personal Email." The Name field 304 can be used to associate a user's name with the electronic mail account. The Email Address field 306 can be used to enter an email address of the electronic mail account. Email Service setting 308 can be used to select an electronic mail service provider. In this embodiment, the Email Service setting 308 takes the form of a drop-down menu. As depicted in FIG. 3, the drop-down menu of the Email Service setting 308 is expanded to show a list of electronic mail services ('Service 1,' 'Service 2' and 'Service 3'). For example, 'Service 1' can be Apple Inc.'s iCloud Mail™ service and 'Service 2' can be Yahoo Inc.'s Yahoo! Mail™ service. Upon selecting an electronic mail service in the Email Service setting 308, one or more settings can be automatically configured based on commonly used and well-known configurations associated with the selected electronic mail service (i.e., settings depicted in FIGS. 4 and 5 are automatically configured). The user can also select 'None' if their electronic mail service is not listed.

FIG. 4 shows an exemplary interface 400 for configuring incoming mail server settings in accordance with some embodiments. The interface 400 can be an interface included in the electronic mail client 108. Similar to the interface 300, a user can interface with interface 400 using a screen display and a user interface device of the client device 102. The interface 400 can be used to configure incoming mail server settings for an electronic mail account, e.g., an electronic mail account configured in the interface 300 of FIG. 3. The incoming mail server can be an exemplary embodiment of the server 104. The interface 400 can include an Account Type setting 402, a Host Name field 404, a Password field 406, a Port setting 408, an Authentication setting 410, a Secure Sockets Layer (SSL) setting 412, and a Dynamic Update setting 414. The Account Type setting 402 can be used to select the account type associated with the incoming mail server. Commonly used account types include POP, IMAP, and Exchange. The Host Name field 404 is used to identify the incoming mail server's host name. For example, the host name of the incoming mail server can be "mail.e-mailprovider.com." The Password field 406 can be used to enter a password that the incoming mail server may require before electronic mail client 108 can retrieve messages from the server 104. The Port setting 408 can be configured to set which port is used to communicate and retrieve messages from the incoming mail server. Commonly used port numbers include 110 for POP, 143 for IMAP, 993 for IMAP using SSL/TLS and 995 for POP using SSL/TLS. The user can also enter a custom port number by selecting the 'Other' option. The Authentication setting 410 can be used to select an authentication/encryption feature used when communicating with the incoming mail server. Commonly used authentication/encryption features can include password-based authentication, Kerberos, MD5, and Windows NT LAN Manager (NTLM). Alternatively, no authentication can be used when communicating with the incoming mail server. The SSL setting 412 is used to enable or disable SSL/TLS communications with the incoming mail server. Dynamically Update settings 414 can be used to enable or disable automatic configurations to the incoming mail server settings (i.e., allow or disallow dynamic update module 110 to change the settings in FIG. 4). Although the settings depicted in FIG. 4 take the form of checkboxes and text fields, it can be appreciated that these settings can take the form of other controls such as drop-down menus and/or toggle buttons.

FIG. 5 shows an exemplary interface 500 for configuring outgoing mail server settings in accordance with some embodiments. The interface 500 can be an interface of the electronic mail client 108. Similar to the interface 300 and interface 400, a user can interface with interface 500 using a screen display and a user interface device of the client device 102. The interface 500 can be used to configure outgoing mail server settings for an electronic mail account, e.g., an electronic mail account configured in the interface 300 of FIG. 3. The outgoing mail server can be an exemplary embodiment of the server 104. In some embodiments, the outgoing mail server can be a different server (logically and/or physically) than the incoming mail server identified in FIG. 4. The interface 500 can include an Account Type setting 502, a Host Name field 504, a Password field 506, a Port setting 508, an Authentication setting 510, a Secure Sockets Layer (SSL) setting 512, and a Dynamically Update setting 514. The Account Type 502 setting can be used to select the account type associated with the outgoing mail server. Commonly used account types include 'SMTP' and 'Exchange.' The Host Name field 504 is used to identify the outgoing mail server's host name. For example, the host name of the outgoing mail server can be "smtp.emailprovider.com." The Password field 506 can be used to enter a password that the outgoing mail server may require before the server 104 can deliver messages on behalf of the electronic mail client 108. The Port setting 508 can be configured to set which port is used to communicate and deliver messages using the outgoing mail server. Commonly used ports numbers include 25 (for SMTP), 587 (for SMTP/Submission protocol), and 465 (for SMTP using SSL). The user can enter a custom port number by selecting the 'Other' option. The Authentication setting 510 can be used to select an authentication/encryption feature used when communicating with the outgoing mail server. Commonly used authentication/encryption features can include password-based authentication, Kerberos, MD5, and Windows NT LAN Manager (NTLM). Alternatively, no authentication can be used when communicating with the outgoing mail server ('None'). The SSL setting 512 is used to enable or disable SSL/TLS communications with the outgoing mail server. Dynamically Update settings 514 can be used to enable or disable automatic configurations to the outgoing mail server settings (i.e., allow or disallow dynamic update module 110 to change the settings in FIG. 5). Although the settings depicted in FIG. 5 take the form of checkboxes and text fields, it can be appreciated that these settings can take the form of other controls such as drop-down menus and/or toggle buttons.

Figure 6:
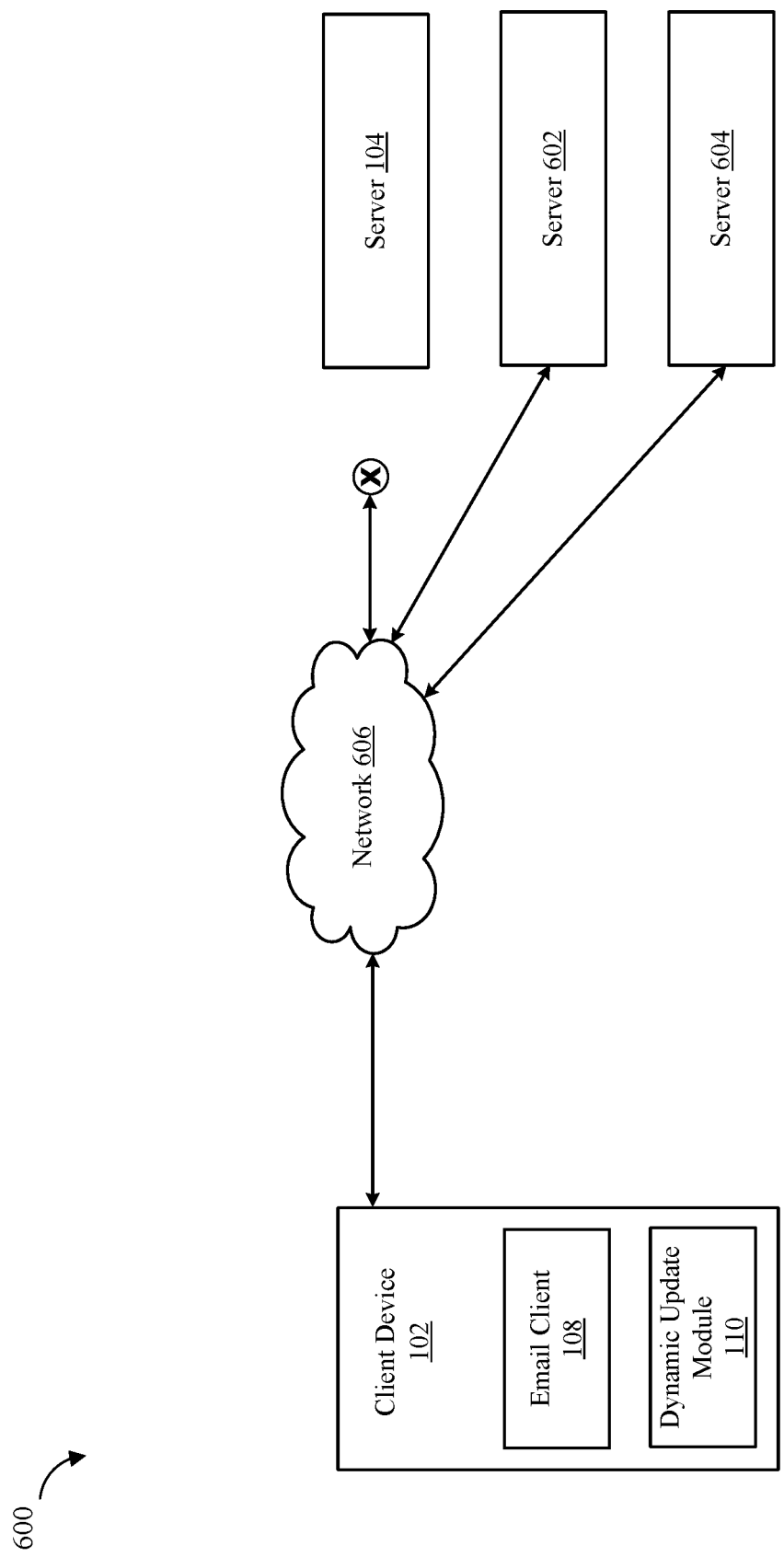
FIG. 6 shows a system in accordance with some embodiments.

FIG. 6 shows a system 600 in accordance with some embodiments. System 600 can include the client device 102, the server 104, a server 602, a server 604 and a network 606. In this embodiment, the client device 102 attempts to establish a connection with the server 104 and/or utilize a service of the server 104 over the network 606 but is unsuccessful. By way of non-limiting example, the unsuccessful attempt can be associated with a port, a host name, an unsupported security feature, an unsupported authentication feature, and/or an incorrect account type (e.g., POP, SMTP, IMAP). In some embodiments, the unsuccessful attempt can cause the client device 102 to receive or generate an error message and/or an error code. For example, the client device 102 can receive the error message "Failed to connect to server. Connection timed out (Error Code 110)," "Connection refused (Error Code 111)," or "Bad Request (Invalid Hostname)." The unsuccessful attempt can be the result of an incorrect configuration of settings used for the electronic mail client 108, a characteristic of the network 606 that is preventing a connection to the server 104, an issue at the server 104 or a combination thereof. For example, a misspelled host name may have been entered in the Host Name field 404 or the Host Name field 504. In another example, the electronic mail client 108 is attempting to establish a connection to the server 104 using a port number that is prohibited by the network 606. In response to the failed attempt, the client device 102 can send a report to the server 602. The report to the server 602 can include any one of: (i) an error message and/or error code associated with the failed attempt, (ii) general email account information (i.e., information relating to the Name field 304, the Email Address field 306 and/or the Email Service setting 308 in FIG. 3), (iii) a setting configuration used in attempting to connect with the server 104 (i.e., information relating to the Account Type setting 402/502, Host Name field 404/504, Password field 406/506, Port setting 408/508, Authentication setting 410/510, and/or Secure SSL setting 412/512), (iv) an identifier that identifies a provider of network 606 (e.g., an Internet service provider (ISP) name) and (v) information about the network 606 (e.g., network information as described in FIG. 1).

The server 602 can store server information associated with the server 104. In some embodiments, the server information is updated frequently so that the server 602 stores the most current information associated with the server 104. For example, the server 602 can be periodically updated as to which security features and port numbers the server 104 supports. In some embodiments, the server 602 can also store network information associated with the network 606. For example, server 602 can store network information that indicates which security features, port numbers, and/or host names the network 606 permits use of.

In response to receiving the report from the client device 102, the server 602 can use the information included in the report to identify server information that can used to configure the electronic mail client 108 (i.e., information relating to the settings depicted in FIGS. 3-5). For example, in the case where the report includes an email address (e.g., an email address entered in the Email Address field 306), the server 602 can identify a domain name of the email address and access a list of server host names associated with the identified domain name. In another example, the server 602 can identify one or more commonly used settings associated with the domain name. The server 602 can then respond to the report by sending the server information to the client device 102. In this regard, the server 602 can provide information to the client device 102 that can be used in subsequent connection attempts to the server 104.

In some embodiments, the client device 102 can compare the server information received from the server 602 with the settings used during the failed connection attempt and/or with any error message/code associated with the failed connection attempt. For example, in the case where the server information includes a list of server host names, the client device 102 can compare the host name used during the failed connection attempt with the list of server host names. If the host name that was used by the client device 102 is not on the list of server host names, then the client device 102 can determine that it used an incorrect or "bad" host name. Accordingly, the settings of the electronic mail client 108 can then be updated based on the server information. The acts of sending the report to the server 602, comparing the server information with current settings, and updating the settings of the electronic mail client 108 can be performed by the dynamic update module 110. In other embodiments, the server 602 can compare the information included in the report with the server information (and/or other information accessible to the server 602). In this regard, the server 602 can determine and indicate to the client device 102 which settings should be used. For example, in addition to the server information, the server 602 can send the client device 102 an indication that client device 102 used an incorrect host name and provide a new host name to use.

In some embodiments, in response to the failed connection to the server 104 the client device 102 can update the settings of the electronic mail client 108 based on server information associated with another server 604. The server 604 can be similar to the server 104 in that it provides various electronic mail services. The server 604 can be an incoming mail server, outgoing mail server, or both. The client device 102 can then attempt to connect to the server 604 instead of the server 104. The server information associated with the server 604 can be received from the server 602 and/or can be previously stored on the client device 102. This can be particularly useful when the server 104 is not available over network 606. For example, network 606 can prohibit connection to server 104 completely or limit some features/services of server 104 over the network 606. For example, the server 104 can only be accessed through a virtual private network (VPN) which network 606 does not support.

Figure 7:
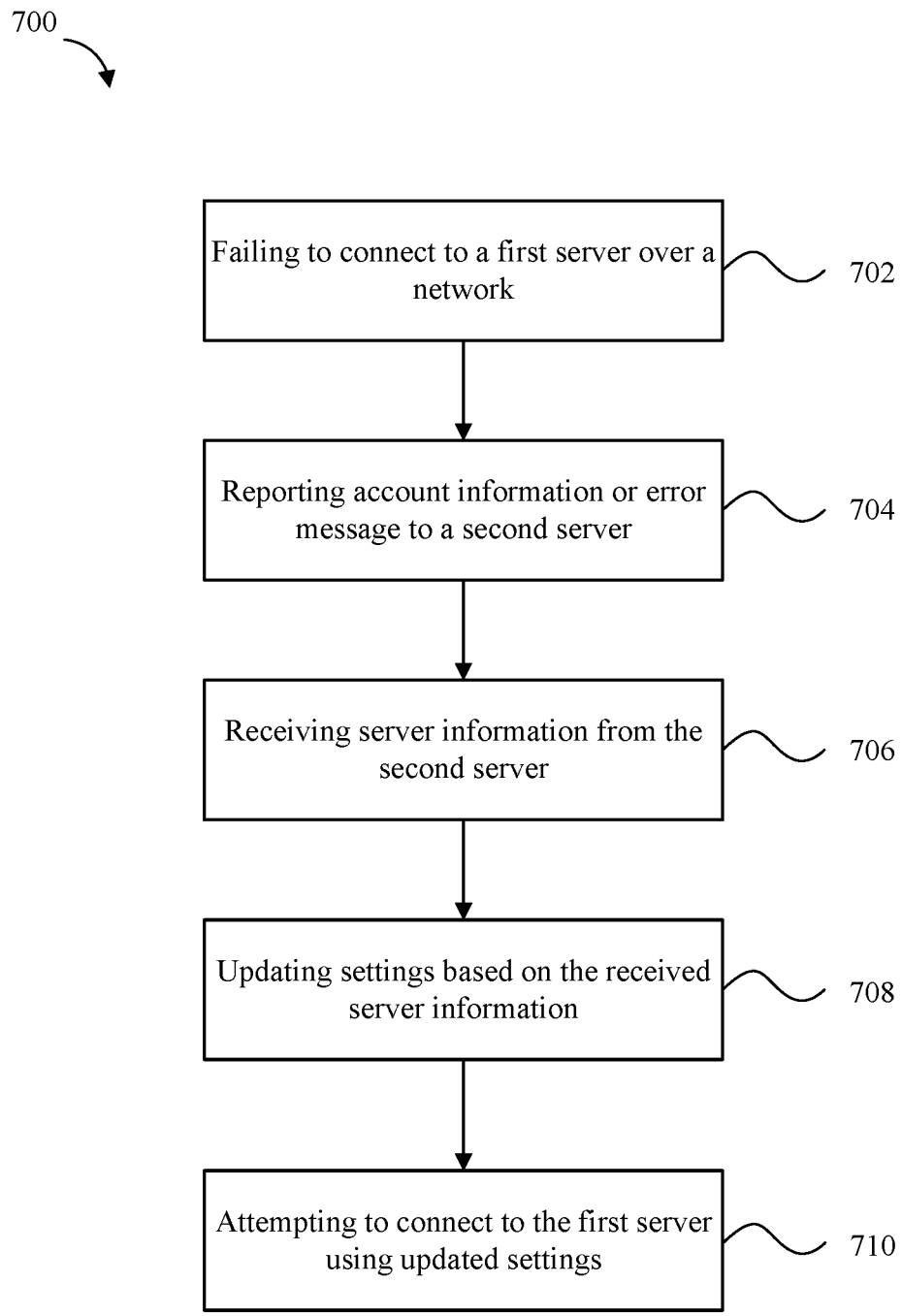
FIG. 7 shows a block diagram representing a method for dynamically updating settings of an application in accordance with some embodiments.

FIG. 7 is a block diagram 700 representing a method for dynamically updating settings of an application in accordance with some embodiments. The method can be carried out by an exemplary client device 102. Step 702 includes the client device 102 failing to connect to a first server, e.g., server 104, over a network, e.g. network 606. The failed connection can occur when the client device 102 attempts to retrieve or deliver an electronic message. In an alternative embodiment, a successful connection to the server 104 can be achieved but the client device 102 is prevented from retrieving or delivering messages with the server 104. Next at step 704, the client device 102 can send a report to a second server, e.g., server 602. The report can include account information associated with an email account, a settings configuration of the electronic mail client 108, and/or error information associated with the failed attempt to connect to the server 104. At step 706, the client device 102 can receive server information from the server 602. The server information can include information associated with the server 104. The client device 102 can update the settings of the electronic mail client 108 based on the server information it received from server 602 at step 708. At step 710, the client device 102 can attempt to connect to the server 104 again using the updated settings.

Figure 8:
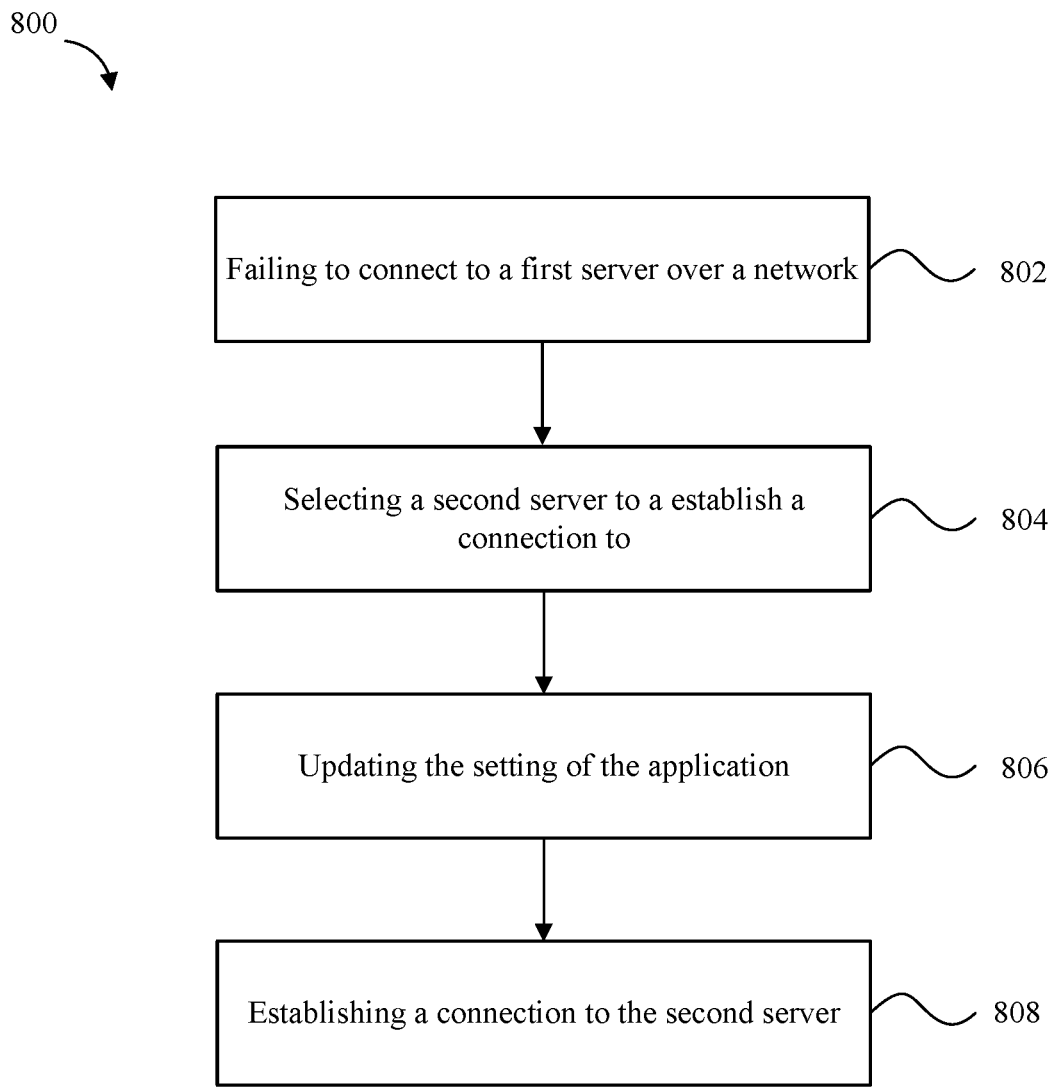
FIG. 8 shows a block diagram representing a method for connecting to an alternative server in accordance with some embodiments.

FIG. 8 is a block diagram 800 representing a method for connecting to an alternative server in accordance with some embodiments. The method can be carried out by an exemplary client device 102. Step 802 includes the client device 102 failing to connect to a first server, e.g., server 104, over a network, e.g. network 606. The failed connection can occur when the client device 102 attempts to retrieve or deliver an electronic message. In an alternative embodiment, a successful connection to the server 104 can be achieved but the client device 102 is prevented from retrieving or delivering messages with the server 104. At step 804, the client device 102 can select a second server, e.g., server 604, to establish a connection to. The selection of the second server can be based on information stored at the client device 102 or information received from another entity such as server 602. For example, the client device 102 can receive information from the server 602 indicating that the server 104 is no longer available in addition to a list of available servers the client device 102 can use. At step 806, the settings of the electronic mail client 108 are updated to enable the electronic mail client 108 to connect to the server 604 instead of the server 104 in subsequent connection attempts. Next at step 808, the client device 102 can establish a connection to the second server 604.

In addition to dynamically updating settings of the electronic mail client 108 to account for various characteristics of different networks, the embodiments described herein can also dynamically update settings of the electronic mail client 108 to account for changes made to the server 104. In this regard, when the server 104 is upgraded to support a security feature, authentication feature, or use of a port that was previously not supported, the settings of the electronic mail client 108 can be updated to take advantage of the upgrades. For example, the server 104 can be upgraded to permit SSL/TLS communications with one or more client devices, whereas prior to the upgrade communications with the server 104 was unencrypted. The electronic mail client 108 can be automatically configured to enable SSL/TLS communications when communicating with the server 104. In some embodiments, the electronic mail client 108 can be automatically configured to "downgrade" communications with the server 104, e.g., disable SSL/TLS communications (i.e., communicate unencrypted).

Figure 9:
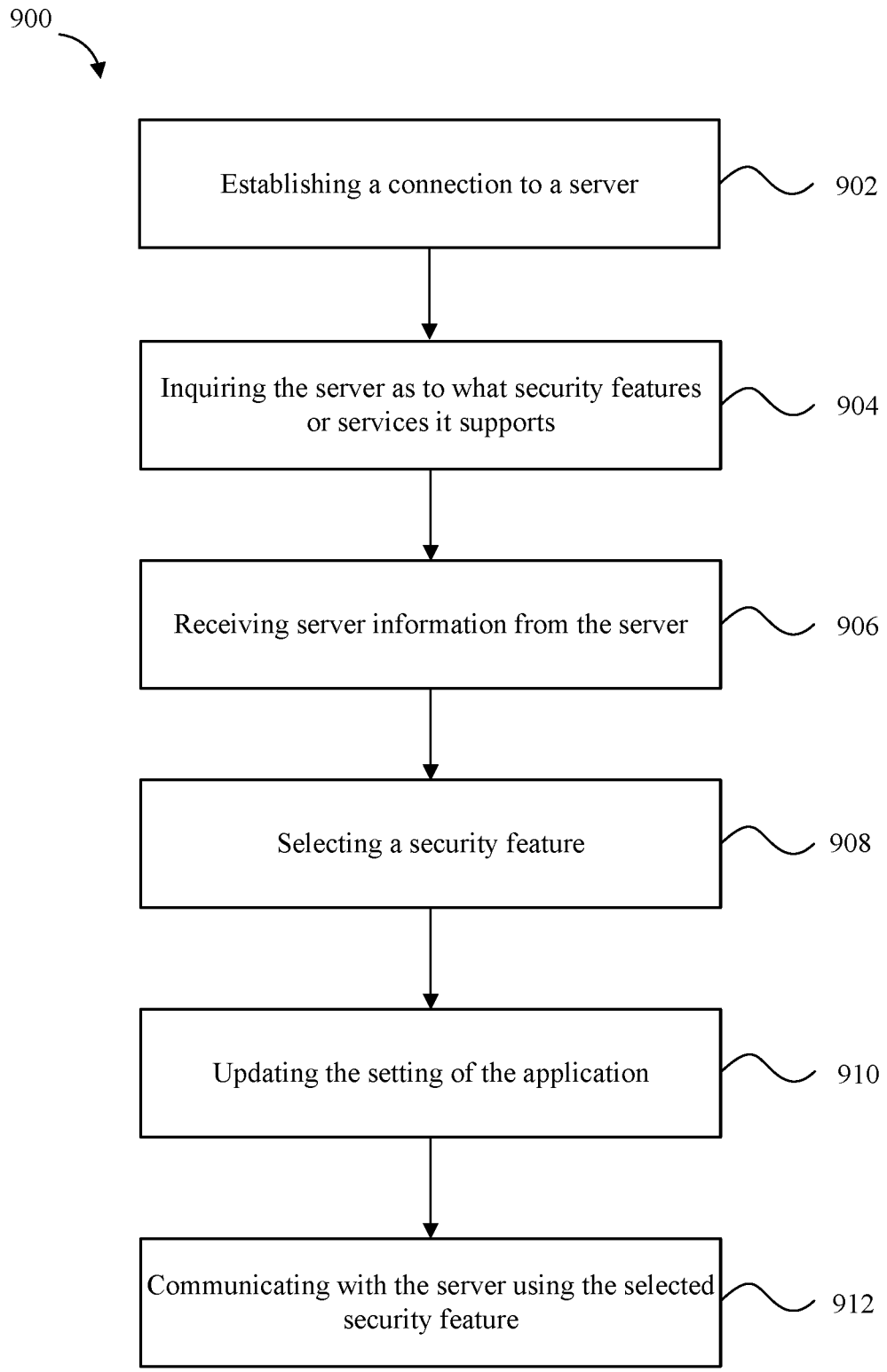
FIG. 9 shows a block diagram representing a method for dynamically updating settings of an application in accordance with some embodiments.

FIG. 9 is a block diagram 900 representing a method for dynamically updating settings of an application in accordance with some embodiments. The method can be carried out by an exemplary client device 102. At a first step 902, the client device 102 can establish a connection to a server, e.g., the server 104. The client device 102 can use the last known successful configuration of settings for the electronic mail client 108 to connect to the server 104 in step 902. In some embodiments, the connection to the server 104 during step 902 is unencrypted. This can be the case when the last known successful configuration of settings for the electronic mail client 108 does not include encrypted security features enabled (i.e., the server 104 did not support encryption in previous connections). Step 904 can include inquiring the server as to what security features or services it supports. In response, at 906 the server 104 can send the client device 102 server information that identifies security features and/or ports that the server 104 supports (i.e., a list of supported features and ports). For example, the server 104 can indicate that it supports communications in accordance with a STARTTLS protocol. In this regard, the client device 102 is now aware of the most current security features the server 104 supports and can update the settings of the electronic mail client 108 accordingly. In some cases, updating includes enabling security features that were not available in previous connections with the server 104 (i.e., upgrading security). At step 908, the client device 102 selects one or more security features to be used with the server 104. Step 908 can include the client device 102 accessing a ranked list of security features and selecting one or more security features based on rank. In some embodiments, the ranking can be based on the strength of encryption associated with a security feature. The selection can also be based on the server information the server 104 provided the client device 102 in step 906. At step 910, the settings of the electronic mail client 108 can be updated based on the server information. Step 912 can include changing one or more security settings or port settings of the electronic mail client 108 (e.g., SSL settings 412/512 as described in FIGS. 4 and 5). In this regard, the client device 102 can utilize security features discovered during steps 904-908 in subsequent connections to the server 104. Next at step 912, the client device 102 communicates with the server 104 using the security feature selected in step 908. Step 912 can include negotiating a security level based on the selected security feature. For example, the client device 102 and the server 104 can exchange digital signatures, keys, tokens, etc. as required by the selected security feature during the negotiation.

Figure 10:
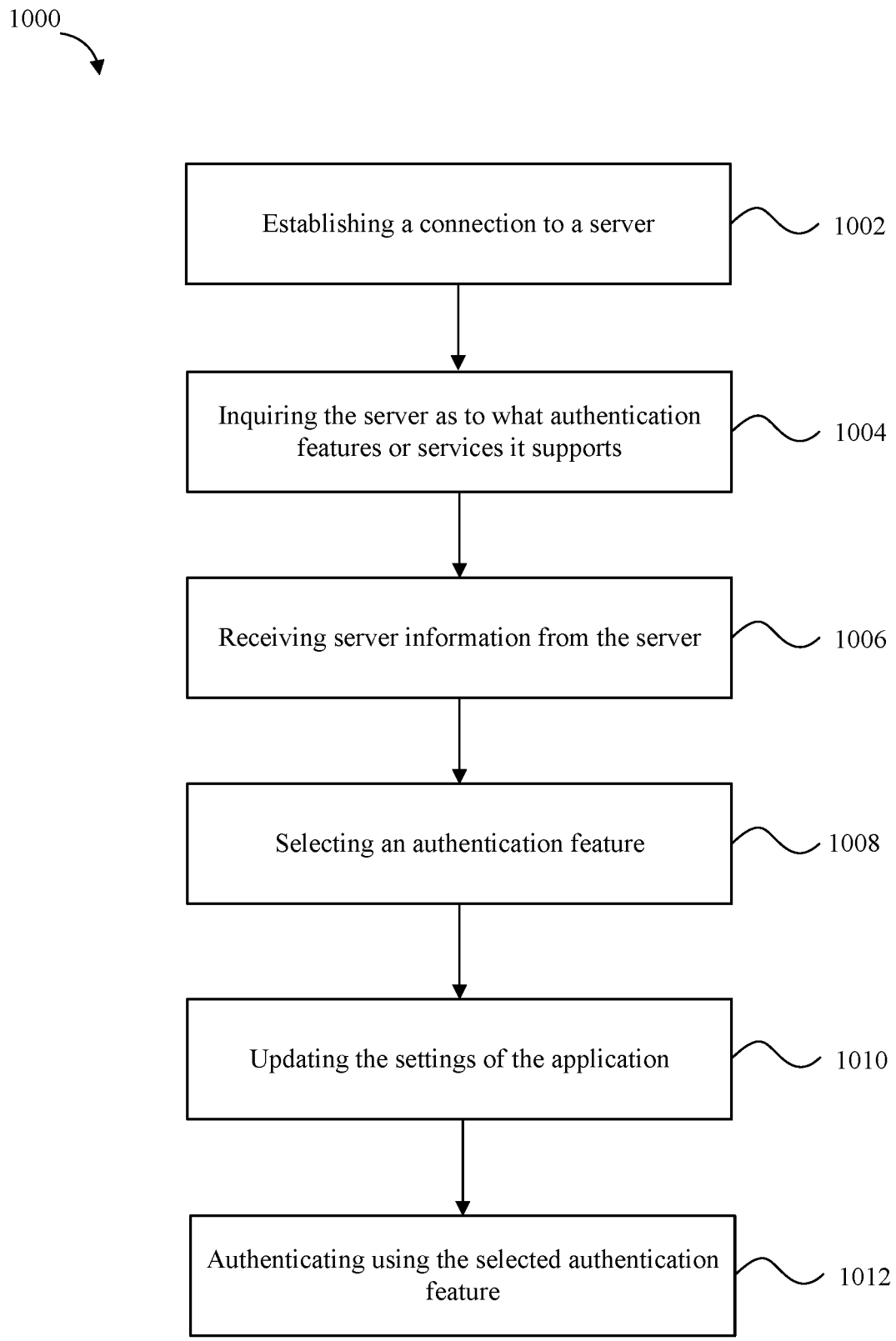
FIG. 10 shows a block diagram representing a method for dynamically updating settings of an application in accordance with some embodiments.

FIG. 10 is a block diagram 1000 representing a method for dynamically updating settings of an application in accordance with some embodiments. The method can be carried out by an exemplary client device 102. At a first step 1002, the client device 102 can establish a connection to a server, e.g., the server 104. The client device 102 can use the last known successful configuration of settings for the electronic mail client 108 to connect to the server 104 in step 1002. Step 1004 can include inquiring the server as to what authentication features it supports. The authentication features can be used to authenticate the client device 102 (by way of the electronic mail client 108) when the client device 102 attempts to retrieve or deliver messages using the server 104. In this regard, an authentication feature can be considered a type of security feature. In response, at step 1006 the server 104 can send the client device 102 server information that identifies authentication features that the server 104 supports (i.e., a list of supported features). For example, the server 104 can indicate that it supports authentication in accordance with a Kerberos protocol. In this regard, the client device 102 is now aware of the most current authentication features the server 104 supports and can update the settings of the electronic mail client 108 accordingly. In some cases, updating includes enabling authentication features that were not available in previous connections with the server 104 (i.e., upgrading authentication). At step 1008 the client device 102 selects an authentication feature to be used with the server 104. Step 1008 can include the client device 102 accessing a ranked list of authentication features and selecting the one or more security features based on rank. In some embodiments, the ranking can be based on the strength of encryption associated with an authentication feature. The selection can also be based on the server information the server 104 provided the client device 102 in step 1006. Next at step 1010, the settings of the electronic mail client 108 can be updated based on the server information. Step 1010 can include changing one or more authentication settings in the electronic mail client 108 (e.g., Authentication settings 410/510 as described in FIGS. 4 and 5). In this regard, the client device 102 can utilize authentication features discovered during steps 1004-1008 in subsequent connections to the server 104. At step 1012, the client device 102 authenticates with the server 104 using the authentication feature selected in step 1008.

Figure 11:
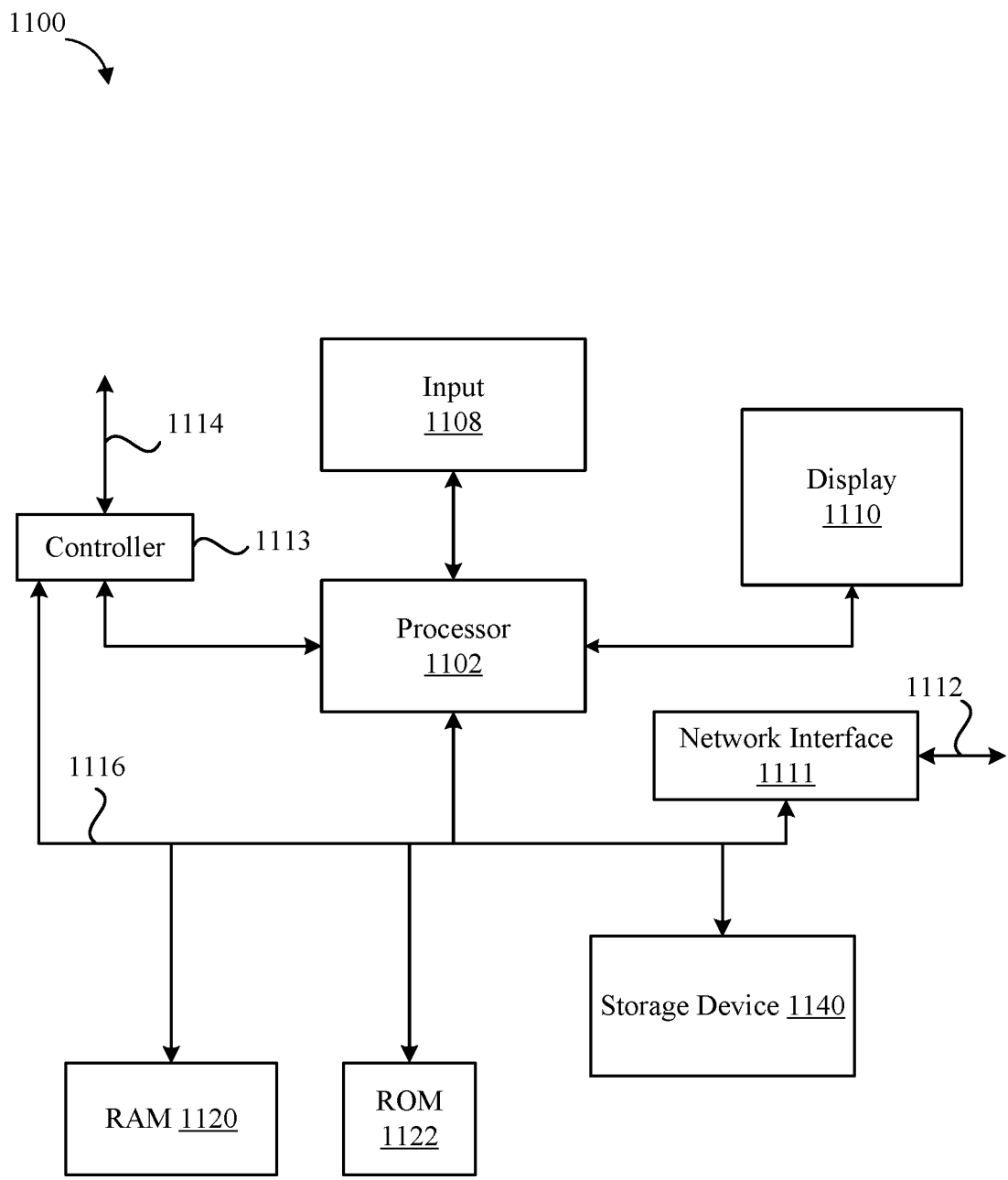
FIG. 11 shows a block diagram of a computing device in accordance with some embodiments.

FIG. 11 is a block diagram of a computing device 1100 that can represent the components of the client device 102 and/or the server 104. As shown in FIG. 11, the computing device 1100 can include a processor 1102 that represents a microprocessor or controller for controlling the overall operation of computing device 1100. The computing device 1100 can also include user input device 1108 that allows a user of the computing device 1100 to interact with the computing device 1100. For example, user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by processor 1102 to display information to the user. Data bus 1116 can facilitate data transfer between at least storage device 1140, processor 1102, and controller 1113. Controller 1113 can be used to interface with and control different equipment through equipment control bus 1114. The computing device 1100 can also include a network/bus interface 1111 that couples to data link 1112. Data link 1112 can allow the computing device 1100 to couple to a host computer or to accessory devices. The data link 1112 can be provided over a wired connection or a wireless connection. In the case of a wireless connection, network/bus interface 1111 can include a wireless transceiver.

The computing device 1100 can also include a storage device 1140, which can comprise a single disk or a plurality of disks (e.g., hard drives), and includes a storage management module that manages one or more partitions (also referred to herein as "logical volumes") within the storage device 1140. In some embodiments, storage device 1140 can include flash memory, semiconductor (solid state) memory or the like. The computing device 1100 can also include Random Access Memory (RAM) 1120 and Read-Only Memory (ROM) 1122. The ROM 1122 can store programs, utilities or processes to be executed in a non-volatile manner. The RAM 1120 can provide volatile data storage, and store instructions related to components of the storage management module 1150 that are configured to carry out the various techniques described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable storage medium is any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamically updating configuration settings for an email account registered within an electronic mail client installed on a computing device, the method comprising, at a first server:
    receiving, from the electronic mail client, a report indicating that first configuration settings failed to enable the electronic mail client to login to the email account;
    identifying, based on the report, second configuration settings for the email account, wherein the second configuration settings include information associated with a second server for logging into the email account; and
    providing the second configuration settings to the electronic mail client, wherein the second configuration settings cause the electronic mail client to login to the email account using the second configuration settings.

2. The method of claim 1, wherein the report further identifies at least one of:
    (i) a third server,
    (ii) details for retrieving and/or delivering emails associated with the email account using the third server,
    (iii) a port setting,
    (iv) an authentication setting, or
    (iv) a secure sockets layer (SSL) setting to retrieve and/or deliver emails associated with the email account using the second server.

3. The method of claim 2, wherein attempting to connect to the third server is performed over a network, and the report further includes network information associated with the network.

4. The method of claim 1, wherein:
    the electronic mail client attempts to retrieve and/or deliver emails associated with the email account using the second server while the second configuration settings are applied to the email account; and
    the method further includes, in response to the electronic mail client successfully retrieving and/or delivering emails associated with the email account using the second server:
        receiving a notification that indicates emails associated with the email account were successfully retrieved and/or delivered using the second server.

5. The method of claim 4, further comprising:
    updating internal configuration settings in response to receiving the notification.

6. The method of claim 1, wherein the first and second configuration settings for the email account are respectively associated with an incoming mail server name and/or an outgoing mail server name for the second server.

7. The method of claim 6, wherein the incoming mail server name and/or the outgoing mail server name are distinct from one another between the first and second configuration settings.

8. The method of claim 6, wherein the second configuration settings include a list of mail server names to be used in lieu of the incoming mail server name and/or outgoing mail server name for the second server.

9. At least one non-transitory computer readable storage medium configured to store instructions that, when executed by at least one processor included in first server, cause the first server to dynamically update configuration settings for an email account registered within an electronic mail client installed on a computing device, by carrying out steps that include:
    receiving, from the electronic mail client, a report indicating that first configuration settings failed to enable the electronic mail client to login to the email account;
    identifying, based on the report, second configuration settings for the email account, wherein the second configuration settings include information associated with a second server for logging into the email account; and
    providing the second configuration settings to the electronic mail client, wherein the second configuration settings cause the electronic mail client to login to the email account using the second configuration settings.

10. The at least one non-transitory computer readable storage medium of claim 9, wherein the report further identifies at least one of:
    (i) a third server,
    (ii) details for retrieving and/or delivering emails associated with the email account using the third server,
    (iii) a port setting,
    (iv) an authentication setting, or
    (iv) a secure sockets layer (SSL) setting to retrieve and/or deliver emails associated with the email account using the second server.

11. The at least one non-transitory computer readable storage medium of claim 10, wherein attempting to connect to the third server is performed over a network, and the report further includes network information associated with the network.

12. The at least one non-transitory computer readable storage medium of claim 9, wherein:
    the electronic mail client attempts to retrieve and/or deliver emails associated with the email account using the second server while the second configuration settings are applied to the email account; and the steps further include, in response to the electronic mail client successfully retrieving and/or delivering emails associated with the email account using the second server:

receiving a notification that indicates emails associated with the email account were successfully retrieved and/or delivered using the second server.

13. The at least one non-transitory computer readable storage medium of claim 9, wherein the first and second configuration settings for the email account are respectively associated with an incoming mail server name and/or an outgoing mail server name for the second server.

14. The at least one non-transitory computer readable storage medium of claim 13, wherein the incoming mail server name and/or the outgoing mail server name are distinct from one another between the first and second configuration settings.

15. A first server configured to dynamically update configuration settings for an email account registered within an electronic mail client installed on a computing device, the first server comprising:

at least one processor; and at least one memory storing instructions that, when executed by the at least one processor, cause the first server to:

receive, from the electronic mail client, a report indicating that first configuration settings failed to enable the electronic mail client to login to the email account;

identify, based on the report, second configuration settings for the email account, wherein the second configuration settings include information associated with a second server for logging into the email account; and provide the second configuration settings to the electronic mail client, wherein the second configuration settings cause the electronic mail client to login to the email account using the second configuration settings.

16. The first server of claim 15, wherein the report further identifies at least one of:

(i) a third server, (ii) details for retrieving and/or delivering emails associated with the email account using the third server, (iii) a port setting, (iv) an authentication setting, or (iv) a secure sockets layer (SSL) setting to retrieve and/or deliver emails associated with the email account using the second server.

17. The first server of claim 16, wherein attempting to connect to the third server is performed over a network, and the report further includes network information associated with the network.

18. The first server of claim 15, wherein:

the electronic mail client attempts to retrieve and/or deliver emails associated with the email account using the second server while the second configuration settings are applied to the email account; and the at least one processor further causes the first server to, in response to the electronic mail client successfully retrieving and/or delivering emails associated with the email account using the second server:

receive a notification that indicates emails associated with the email account were successfully retrieved and/or delivered using the second server.

19. The first server of claim 15, wherein the first and second configuration settings for the email account are respectively associated with an incoming mail server name and/or an outgoing mail server name for the second server.

20. The first server of claim 19, wherein the incoming mail server name and/or the outgoing mail server name are distinct from one another between the first and second configuration settings.

* * * * *